May 20, 1930.  P. E. HANSEN  1,759,194
RECORDING DEVICE FOR MOTOR VEHICLES
Filed Oct. 3, 1928
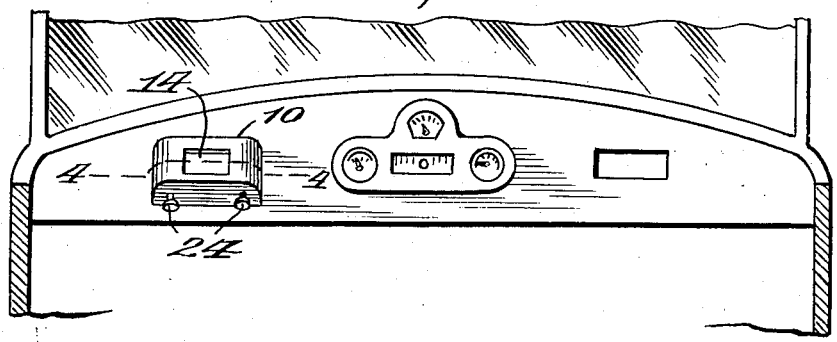
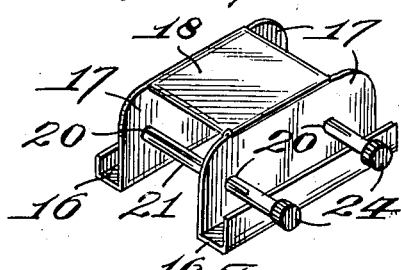
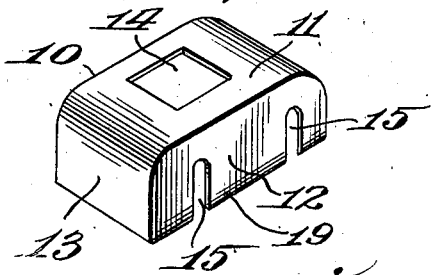
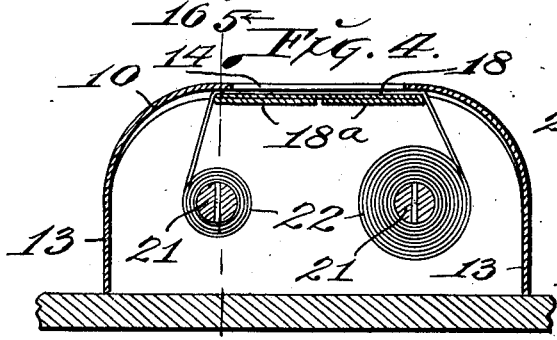
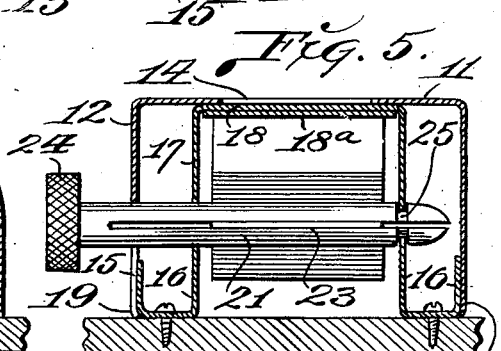
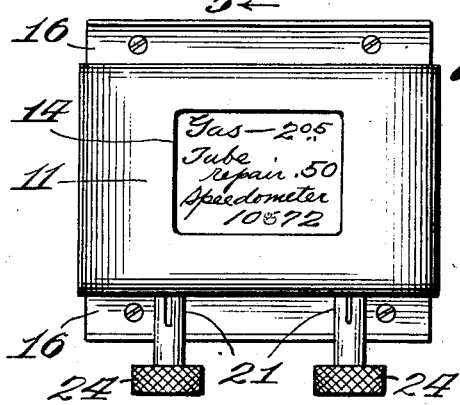
INVENTOR:—
PAUL E. HANSEN.
By Martin P. Smith
ATTY.

Patented May 20, 1930

1,759,194

UNITED STATES PATENT OFFICE

PAUL E. HANSEN, OF RIVERSIDE, CALIFORNIA

RECORDING DEVICE FOR MOTOR VEHICLES

Application filed October 3, 1928. Serial No. 310,141.

My invention relates to a recording device that is especially designed for use upon motor vehicles and the principal object of my invention is to provide a device of the character referred to that is relatively simple in construction, inexpensive of manufacture and which may be advantageously employed for keeping a record of data relating to the operation of a motor vehicle, for instance, the cost of supplies and repairs, the mileage as indicated by the speedometer of the vehicle, and any other data or items that the operator or driver of the vehicle may desire to record.

Further objects of my invention are to provide a recording device or log that comprises relatively few parts, the same being arranged so as to form a convenient compact structure that serves as a support and housing for a roll of paper upon which the recorded data is written, and further to provide a recording device that may be readily applied to the dash or instrument-board of a motor vehicle or to a bracket or support that is located on the steering column or between the spokes of the steering wheel.

With the foregoing and other objects in view, my invention consists in certain novel features of construction and arrangement of parts that will hereinafter be more fully described and claimed and illustrated in the accompanying drawing, in which:

Fig. 1 is an elevational view of the instrument board of an automobile and showing my improved recording device in position thereon.

Fig. 2 is a perspective view of the frame of the device that supports the paper carrying spindles.

Fig. 3 is a perspective view of the cover or housing of the device.

Fig. 4 is an enlarged cross section taken on the line 4—4 of Fig. 1.

Fig. 5 is a cross section taken approximately on the line 5—5 of Fig. 4.

Fig. 6 is an enlarged plan view of the recording device.

Referring by numerals to the accompanying drawings which illustrate a practical embodiment of my invention, 10 designates a housing that is preferably stamped or pressed from suitable sheet metal, and said housing comprising a top plate 11, side walls 12 and end walls 13. This housing is approximately rectangular in shape and formed in the center of the top plate 11 is an opening 14, preferably square or rectangular in shape.

Formed in one of the side walls 12 and extending upwardly from the lower edge thereof are slots 15 for the accommodation of the spindles that carry the paper that receives the written data.

The frame of the device that is located beneath the housing and which serves as a combined table for the paper and a support for the spindles comprises a section of sheet metal having its ends bent to form channel shaped members 16, and the inner portions of which channel shaped members are extended upwardly to form side walls 17 and connecting the intermediate portions of the upper edges of the side walls 17 is a flat smooth section of sheet metal 18.

This flat section of metal 18 functions as a table or writing surface over which the web of paper passes and to stiffen and reinforce said table portions of the metal from which the frame is formed at the ends of said table are bent inwardly so as to lie directly against the under surface of the table 18 and said inwardly bent portions being designated by the numeral 18ª.

The bottoms of the channel shaped portions 16 are provided with apertures for the reception of screws or like devices that are utilized in securing the frame to the instrument board or dash board of a vehicle, or to a suitable supporting bracket.

The lower edges of the side walls 12 of the housing are curved slightly inward as designated by 19 and these inwardly curved lower edges fit snugly against the lower outer corners of the channel-shaped members 16 when the housing is positioned over the frame and such engagement securely retains the housing in position upon said frame.

Formed through the side walls 17 of the frame at points below the ends of the table 18 and in alinement with the upper ends of the slots 15 are apertures 20 which serve as bearings for the spindles 21 that carry the paper 22 upon which the recording data is written. These spindles are slotted longitudinally, as designated by 23, for the reception of the ends of the web of paper and each spindle is provided on one end with a head or knob 24 by means of which the spindle may be engaged and rotated.

Formed in the spindle near the end opposite the end that is provided with the knob 24 is a circumferential groove 25 which, when the spindle is positioned for use in the holder, receives the edge of one of the side walls 17 around the opening 20 therein, thus holding the spindle in proper operative position.

In this connection it will be understood that when the device is assembled for use the parts of each spindle on opposite sides of the slot therein, are spread slightly apart and thus when the spindle is inserted through the openings 20 in the side walls 17 of the frame the parts of each spindle will automatically spread apart when the groove 25 reaches the corresponding openings 20, thus providing a bearing for the spindle that will prevent its withdrawal until the parts to the sides of the slot 23 are pressed together, which latter operation will enable the spindle to be withdrawn.

The web of paper 22 between the portions that are on the spindles 21 passes upwardly over the table 18, and which table is located directly below the opening 14.

In the operation of my improved recording device one of the spindles is manually rotated to bring an intermediate portion of the web of paper into position on the table beneath opening 14 and data relating to the cost of supplies or repairs or any other memoranda may be written on the exposed portion of the paper and by again rotating the spindle that portion of the web of paper bearing the written data may be wound onto the spindle that is rotated and an unwritten portion of the paper will be brought into position on the table below opening 14.

A recording device of my construction is comparatively simple, comprising but four parts, is very compact, may be conveniently located on a part of the motor vehicle adjacent to the operator's seat, and provides simple and efficient means for deceiving and holding the data relating to the operation of the equipped vehicle or any other data that the operator desires to record.

It will be understood that minor changes in the size, form and construction of the various parts of my improved recording device may be made and substituted for those herein shown and described without departing from the spirit of my invention, the scope of which is set forth in the appended claims.

I claim as my invention:

1. In a recording device of the class described, a one piece frame comprising side walls, channel-shaped members on the lower ends of said side walls and a paper supporting table connecting the upper portions of said side walls, a housing adapted to enclose said frame, said housing being provided in its top with an opening that exposes said table, the lower edges of the side walls of the housing having inturned edges for engagement with the lower outer corners of the channel-shaped members on the lower portions of the side walls of the frame, and slotted paper carrying spindles journaled in the side walls of the frame.

2. In a recording device of the class described, a one-piece frame comprising a pair of side walls, a paper supporting table connecting the upper portions of said side walls, flanges projecting outwardly and upwardly from the lower edges of said side walls, paper carrying spindles journaled for rotation in the side walls of said frame, a housing adapted to enclose said frame, there being an opening in the top of said housing for exposing the table on the frame, the lower edges of the side walls of the housing being curved inwardly for engagement with the lower corners of the flanges on the frame and one of the side walls of the housing being slotted for the accommodation of the paper carrying spindles.

In testimony whereof I affix my signature.

PAUL E. HANSEN.